US007187794B2

(12) United States Patent
Liang et al.

(10) Patent No.: US 7,187,794 B2
(45) Date of Patent: Mar. 6, 2007

(54) NOISE TREATMENT OF LOW-DOSE COMPUTED TOMOGRAPHY PROJECTIONS AND IMAGES

(75) Inventors: Zhengrong Liang, Stony Brook, NY (US); Hongbing Lu, Setauket, NY (US); Xiang Li, Centereach, NY (US)

(73) Assignee: Research Foundation of State University of New York, Stony Brook, NY (US)

( * ) Notice: Subject to any disclaimer, the term of this patent is extended or adjusted under 35 U.S.C. 154(b) by 746 days.

(21) Appl. No.: 10/273,927

(22) Filed: Oct. 18, 2002

(65) Prior Publication Data

US 2003/0076988 A1   Apr. 24, 2003

(51) Int. Cl.
  *G06K 9/00* (2006.01)
(52) U.S. Cl. ............................ 382/131; 378/4; 378/901
(58) Field of Classification Search ........ 382/128–134; 378/4, 19, 21, 23–27, 37, 46, 52, 62, 90, 378/98.4, 98.6, 98.9, 101, 140, 901; 600/425, 600/407; 250/363.04, 370.09, 390.02
See application file for complete search history.

(56) References Cited

U.S. PATENT DOCUMENTS

| 4,628,356 | A | * | 12/1986 | Spillman et al. ........... 378/98.8 |
| 4,973,111 | A | * | 11/1990 | Haacke et al. .............. 324/309 |
| 5,440,647 | A | * | 8/1995 | Floyd et al. ................. 382/132 |
| 5,551,431 | A | * | 9/1996 | Wells et al. ................. 600/410 |
| 5,744,802 | A | * | 4/1998 | Muehllehner et al. . 250/363.03 |
| 6,094,050 | A | * | 7/2000 | Zaroubi et al. ............. 324/309 |
| 6,282,257 | B1 | * | 8/2001 | Basu et al. ................... 378/15 |
| 6,411,729 | B1 | * | 6/2002 | Grunkin ..................... 382/132 |
| 6,535,570 | B2 | * | 3/2003 | Stergiopoulos et al. ........ 378/8 |
| 6,584,413 | B1 | * | 6/2003 | Keenan et al. ................ 702/28 |
| 2003/0228041 | A1 | * | 12/2003 | Bae et al. .................... 382/131 |

OTHER PUBLICATIONS

Jeffrey A. Messler, "Penalized Weighted Least-Squares Image Reconstruction for Positron Emission Tomography", IEEE Trans. Medical Imaging, 13(2): 290-300, Jun. 1994.
Wernick et al., "Fast Spatio-Temporal Image Reconstruction for Dynamic PET", IEE Transactions on Medical Imaging, vol. 18, No. 3, Mar. 1999.
Jiang Hsieh, "Adaptive Streak artifact reduction in computed tomography resulting from excessive x-ray photon noise", 1998 Am. Assoc. Phys. Med., Med. Phys. 25, Nov. 1998.

* cited by examiner

*Primary Examiner*—Jingge Wu
*Assistant Examiner*—Abolfazl Tabatabai
(74) *Attorney, Agent, or Firm*—F. Chau & Associates, LLC (57) ABSTRACT

A method for treating noise in low-dose computed tomography projections and reconstructed images comprises acquiring raw data at a low mA value, applying a domain specific filter in a sinogram domain of the raw data, and applying an edge preserving smoothing filter in an image domain of the raw data after filtering in the sinogram domain.

24 Claims, 9 Drawing Sheets

NOISE TREATMENT OF LOW-DOSE COMPUTED TOMOGRAPHY PROJECTIONS AND IMAGES

BACKGROUND OF THE INVENTION

1. Field of the Invention

The present invention relates to digital imaging, and more particularly to a system and method treating noise in computed tomography (CT) projections and reconstructed images.

2. Discussion of Prior Art

Figure 1A:
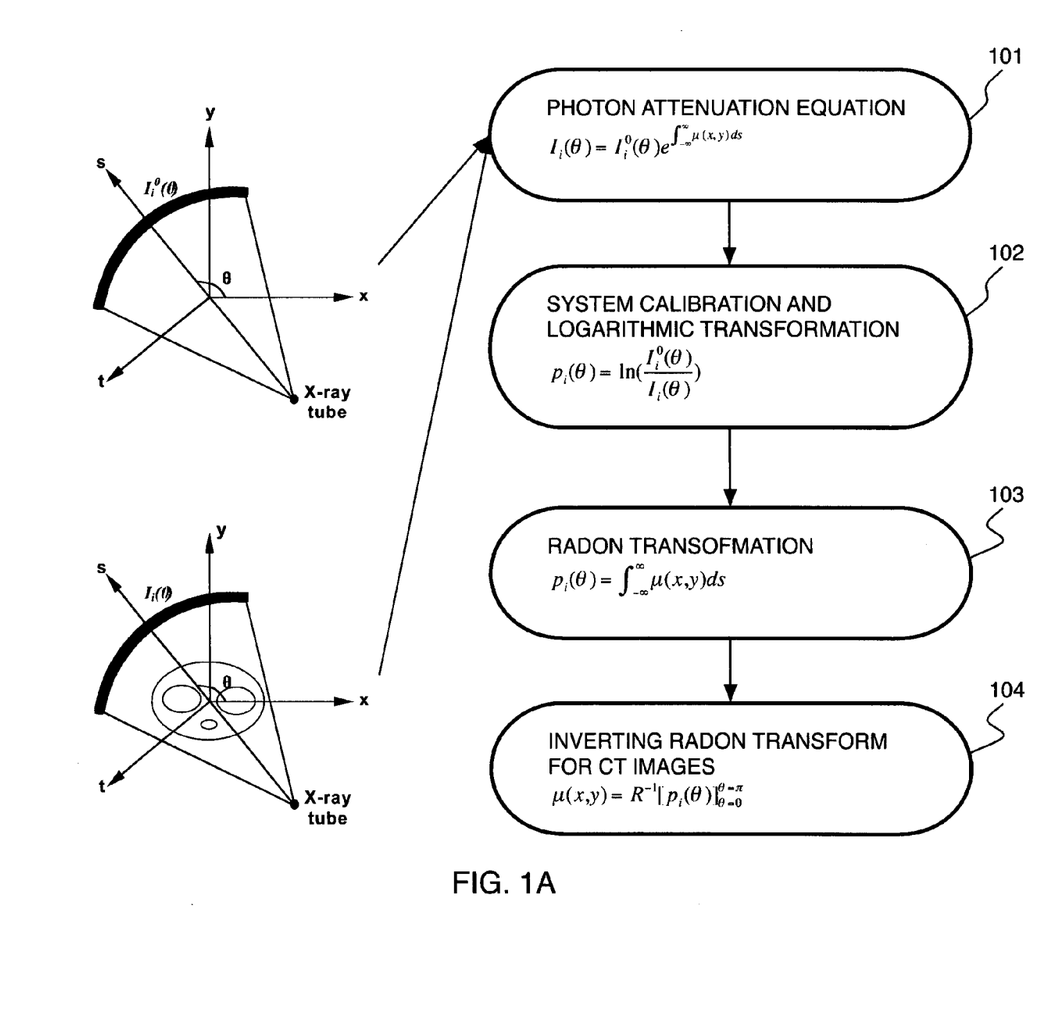
FIG. 1A is a flow chart for a computed tomography or CT system.

Since it was first invented, computed tomography or CT has revolutionized the radiological fields in diagnosis, treatment/surgical planning, and follow-up evaluation of patient management. The fundamentals of the CT technology can be briefly depicted in two dimensions by FIG. 1A. The collected x-ray photons at detector bin i and projection angle $\theta$ is denoted by $I_i^o(\theta)$ in the absence of the body in the field-of-view (FOV) and by $I_i(\theta)$ in the presence of the body in the FOV, where notation x-y denotes the stationary coordinates and s-t denotes the rotating coordinates. The relation between $I_i^o(\theta)$ and $I_i(\theta)$ is given by the photon attenuation equation of $$I_i(\theta) = I_i^o(\theta) \exp\left[-\int_{-\infty}^{+\infty} \mu(x, y) ds\right], \quad (1)$$

where $\mu(x,y)$ represents the attenuation coefficient map of the body to be obtained 101.

As shown in blocks 102 and 103, by a mathematical manipulation of $$p_i(\theta) = \ln\left[\frac{I_i^o(\theta)}{I_i(\theta)}\right], \quad (2)$$

we have the well-known Radon transform of $$p_i(\theta) = \int_{-\infty}^{+\infty} \mu(x, y) ds. \quad (3)$$

The attenuation coefficient map or CT image is reconstructed from the projection data $\{p_i(\theta)\}$ over an angular sampling range of $[0,\pi]$ by inverting the Radon transform of Eqn. (3) 104. The most widely used algorithm for the inversion is based on the filtered backprojection (FBP) technique.

Since the flux of x-ray photons toward the detector band are generated unevenly across the detector bins for i=1, 2, 3, ..., (or laterally), due to the finite size of the tungsten target inside the x-ray tube, a system calibration is necessary on both the measurements of $I_i^o(\theta)$ and $I_i(\theta)$ for an artifact-free image reconstruction.

Currently available CT technology needs a very high x-ray photon flux or equivalently a high mA value (electric current across the x-ray tube) to generate a high quality diagnostic image. This translates into a high radiation exposure to the patient. Technically the need for a high mA value is partially due to the lack of an effective noise reduction technique on the measurement $I_i(\theta)$, since the measurement of $I_i^o(\theta)$ in the absence of the body does not have the dosage limitation and can be acquired with a very high mA value. Then the noise reduction task can be regarded as a task on $I_i(\theta)$.

Currently available spiral/helical CT technology have demonstrated the potential for dynamic imaging in four dimensions at less than 1 mm spatial resolution. However, as stated above, an important limitation for its clinical applications is associated with the high radiation exposure, especially for women and children. One solution is to deliver less x-rays to the body or equivalently lower down the mA value in data acquisition protocols. This will increase the image noise and make the diagnosis difficult.

Currently available spiral/helical CT technology needs a high output of x-ray flux from the x-ray tube to produce an adequate diagnostic image. This high x-ray flux is generated by a high electric current across the x-ray tube, reflected by a high mA protocol (of greater than 200 mA for most clinical studies). For a typical brain CT study, the associated radiation dosage is around the level of 3 Rads (a radiation dose unit), while the annual radiation exposure limit is around 5 Rads for the general population. Thus, two brain CT scans within a year would exceed the limitation. The associated radiation is an important limitation of CT clinical applications for massive screening of the vital organs, such as the heart, lungs, colon, and breasts. Most of the effort in reducing the radiation has been devoted to improving the hardware performance of CT scanners. Software approaches to reducing noise, and thus allowing for lower radiation, have had limited success.

Projection data acquired for image reconstruction of low-dose CT modality are degraded by many factors, including Poisson noise, logarithmic transformation of scaled measurements, and pre-reconstruction corrections for system calibration. All these factors complicate noise analysis on both the projection data and reconstructed images and render a challenging task for noise reduction in order to maintain the high image quality of currently available CT technologies. Up to now, various forms of filtering techniques have been developed to spatially smooth the projection data and/or the reconstructed CT images. One approach models the data noise by Gaussian distribution with variance proportionally depending on the signal or density of the data. It utilizes a nonlinear anisotropic diffusion filter to smooth the data noise. Another approach employs an adaptive trimmed mean filter to reduce streak artifacts, which are resulted from excessive x-ray photon noise in low-dose CT projections. Although both of them succeed in some degrees for noise reduction prior to image reconstruction, the assumption of the noise model is not justified in their applications. Furthermore, the filter parameters are based on ad hoc assumptions and lack of "ground truth." Therefore, further development is then limited. Sauer and Liu [K. Sauer and B. Liu, Nonstationary filtering of transmission tomograms in high photon counting noise, *IEEE Trans. Med. Imag.* 10: 445–452, 1991] developed a non-stationary filtering method for the anisotropic artifacts in the image reconstruction. Although it utilizes local noise properties to construct a set of non-stationary filters, the method is a post-processing type approach on the images, and lacks "ground truth" basis. This type of filtering typically gains noise reduction at the cost of resolution.

Therefore, a need exists for a system and method of treating noise in low-dose CT projections and/or reconstructed images based on "ground truth" knowledge acquired from experimentation.

SUMMARY OF THE INVENTION

According to an embodiment of the present invention a noise treatment method for low-dose CT comprises filtering in sinogram domain and smoothing in image domain. Instead of using traditional filtering that can cause blurring and artifacts, the projection sinograms are treated by a scaled transformation, Wiener filtering, and a Karhunen-Loeve (K-L) domain penalized weighted least square (PWLS) smoothing, which is based on the nonlinear noise property or "ground truth" of the low-dose CT projections acquired from experimentation. By selecting an appropriate number of neighboring sinogram slices, the K-L domain PWLS smoothing fully utilizes the prior statistical knowledge and three-dimensional (3D) spatial information for an accurate restoration of the noisy projections. To treat the streak artifacts, an adaptive filter is incorporated into the PWLS framework. The adaptive filter selectively smoothes those channels contributing to the streak artifacts. The degree of smoothing in the selected channels varies based on the noise level of the signal. Thus, the artifacts in the images can be reduced while preserving the spatial resolution of the system simultaneously. After filtering, the sinograms are reconstructed by the conventional efficient FBP method. In image domain, edge preserving smoothing (EPS), based on the acquired "ground truth", can be implemented for further noise reduction in the reconstructed image that can be approximated by a piecewise substantially constant image after sinogram filtering. The non-linear Gaussian filter (NLGF) Chain, a representative algorithm of the group of EPS, smoothes the image noise without destroying fine details and coarser structures. The present invention has several important advantages, it is numerically robust (choice of the parameters is not critical) and it is much faster than other statistical estimation smoothing. A chain of three to five filters with suitable parameters is enough to differentiate random noise from intrinsic information (structure) in an image.

According to an embodiment of the present invention, a method for treating noise in low-dose CT projections and reconstructed images comprises acquiring raw data at a low mA value, applying a domain specific filter in a sinogram domain of the raw data, and applying an EPS filter in an image domain of the raw data after filtering in the sinogram domain.

The low mA value is less than about 100 mA.

The raw data is patient specific raw data. The raw data is based on an anthropomorphic phantom.

The method further comprises determining the domain specific filter with the raw data, and determining the EPS filter with the raw data.

The method comprises generating a curve for variances and means given the raw data, fitting the curve by a functional form, determining, for a fitted curve, a transformed space having substantially constant variance for all means, and filtering the raw data in the transformed space. The step of filtering further comprises applying one of a Wiener filter and a Kalman filter. The fitting is one of linear, quadratic, non-linear, and square root. Determining, for a fitted curve, a transformed space is by a logarithmic transform for a linear fitting, an inverse tangent transform for a quadratic fitting, a segmented logarithmic transform for a non-linear fitting, and an Anscombe transform for a square-root fitting. All the transformations reduce the variance in the transformed space.

The method comprises generating a curve for variances and means given the raw data, fitting the curve by a functional form, determining, for a fitted curve, a transformed space having substantially constant variance for all means, further determining a signal-to-noise ratio (SNR) in another transformed space, selecting plurality of neighboring sinograms along an axial direction of the CT projections, wherein the raw data is 3D projection data, and applying a Wiener filter and a Kalman filter. Determining the SNR in the another transformed space is by K-L transform.

The method comprises generating a curve for variances and means given the raw data, fitting the curve by a functional form, determining a signal-to-noise ratio (SNR) in the transformed space, selecting plurality of neighboring sinograms along an axial direction of the CT projections, wherein the raw data is 3D projection data, and applying a K-L domain PWLS filter. Determining the SNR in the transformed space is by K-L transform.

The method compromise acquiring a point source response function (PSF) for the K-L domain Wiener filter, Kalman filter, and PWLS filter.

The EPS filter in the image domain is a NLGF chain, wherein the EPS filter is one of adaptive and non-adaptive. An adaptive EPS filter is based on one of a curve and a fitted curve.

The domain specific filters (Wiener, Kalman, and PWLS filters) and the EPS filter are applied to emission computed tomography (ECT) projections, where the raw data is noisy due to low dose radiopharmaceutical administration. The method comprises generating a curve for variances and means given the raw data, fitting the curve by a functional form, determining, for a fitted curve, a transformed space having substantially constant variance for all means according to a square-root or the Anscombe transform, and filtering the raw data in the transformed space, wherein a Kalman filter and a Wiener filter is applied to the raw data.

The ECT projections compromise raw data of SPECT (single photon emission computed tomography) and PET (positron emission tomography).

According to an embodiment of the present invention, a program storage device is provided, readable by machine, tangibly embodying a program of instructions executable by the machine to perform method steps for treating noise in low-dose CT projections and reconstructed images. The method comprises generating a curve for variance and means given a set of raw data, fitting the curve by a functional form, and determining, for a fitted curve, a transformed space having substantially constant variance for all means. The method further comprises applying a domain specific filter in a sinogram domain of the set of raw data, and applying an EPS filter in an image domain of the set of raw data after filtering in the sinogram domain.

The raw data are not limited to CT modality, for example, they can be acquired from SPECT/PET (single photon emission computed tomography/positron emission tomography) modalities, wherein the present invention applies.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1B:
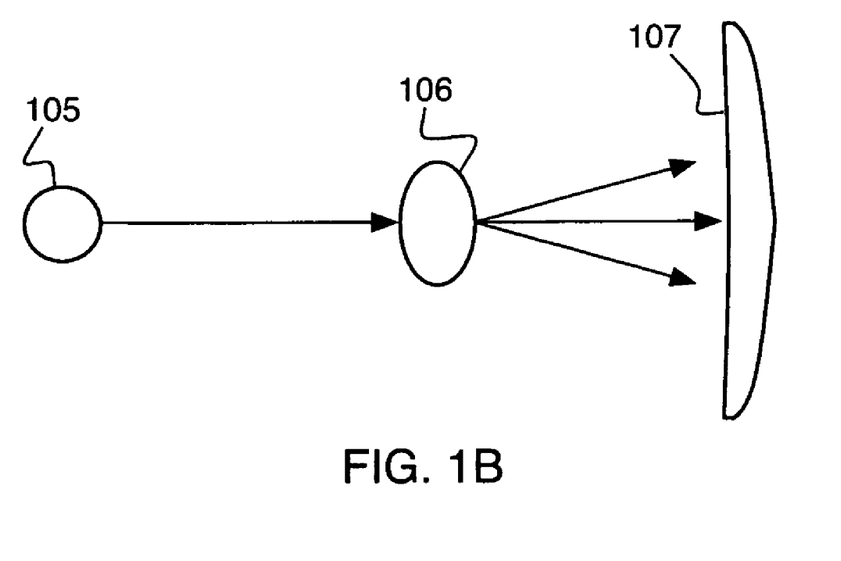
FIG. 1B is a diagram of a CT system.

Referring to FIG. 1B, computed tomography (CT) projections can be obtained by emitting x-rays from a source 105, passing the x-rays through an object of interest 106, such as a patient, and imaging the x-rays on an x-ray detector 107. According to an embodiment of the present invention, a noise treatment method for low-dose CT comprises an adaptive filter in sinogram domain (107) and smoothing in image domain (106).

In the sinogram domain, projection data acquired for image reconstruction of low-dose CT can be degraded by many factors. These factors complicate noise analysis on the projection data and present a challenging task for noise reduction. To achieve accurate noise treatment in sinogram space, the noise properties of the projection data can be determined by analyzing repeatedly acquired experimental anthropomorphic phantom data sets. The statistical analysis shows that the noise can be regarded as normally distributed with a nonlinear signal-dependent variance. According to an embodiment of the present invention, based on this observation, analytical noise treatment methodologies have been developed for the treatment of the projection sinograms, instead of using traditional filtering, which can cause blurring and artifacts.

According to an embodiment of the present invention, a sinogram filtering method can be implemented as a statistical optimization-based approach. Given the Gaussian distribution and the nonlinear mean-variance curve, the penalized weighted least-square (PWLS) principle can be implemented to utilize the obtained noise properties. A modified Karhunen-Loeve (K-L) transform decomposes the data information into components with different signal-to-noise ratio (SNR) properties. A PWLS smoothing in the K-L domain can be performed. By selecting an appropriate number of neighboring sinograms, (for example, if the axial resolution is 3 mm and slice thickness is 1 mm, then an appropriate number of neighboring sinograms is 2, i.e., one below and one above), the K-L domain PWLS smoothing treats these components based on their SNRs respectively. The PWLS utilizes both the prior statistical knowledge and the three-dimensional (3D) spatial information for more accurate noise treatment, where the discrepancy at a location with known SNR can be adaptively filtered out.

The noise treatment methodologies proposed in sinogram domain are analytical or non-iterative, and therefore are computationally efficient. They are based on noise modeling and incorporating the modeled noise properties into a mathematically or statistically rigorous framework. Furthermore, they treat the noise in the sinogram space and fully take the advantages of the fast filtered backprojection (FBP) reconstruction techniques, which is the fastest image reconstruction method.

Another problem induced by low-dose CT are streak artifacts due to photon starvation. Previous analysis (J. Hsieh, Adaptive streak artifacts reduction in computed tomography resulting from excessive x-ray photon noise, Med. Phys. 25(11): 2139–47, 1998) indicates that the logarithm operation of eqn. (2) has played a significant role in the amplification of the noise when the detector signal is low. According to an embodiment of the present invention, to treat the streak artifacts, an adaptive filtering can be incorporated into the PWLS framework based on physical analysis. The adaptive filter selectively smoothes those channels that receive a small number of x-ray photons and mainly contribute to the streak artifacts. The degree of smoothing in the selected channels can vary based on the noise level of the signal. Thus, the artifacts can be reduced in the images while the spatial resolution of the system is simultaneously preserved.

According to an embodiment of the present invention, another analytical noise treatment method utilizes transformations in the same sinogram domain. The method utilizes scale transformations to modulate the projection data so that data variance can be stabilized to be signal independent. By analyzing the relationship between the data standard deviation and the data mean level, a transformation can convert the parametric process into a well-known model. Several different transformations for the stabilization of the non-stationary noise in low-dose CT and emission CT (ECT such as SPECT—single photon emission computed tomography and PET—positron emission tomography) have been developed according to the present invention, for example, a square-root transform for Poisson noise in SPECT and PET and a segmented logarithmic transform for nonlinear noise in low-dose CT. After the scale transformations, the noise variance becomes approximately a constant. A filter, such as a 2D/3D Wiener filter or a Kalman filter, can then be constructed to remove the discrepancy due to noise.

In image domain, edge preserving smoothing (EPS) can be used for further noise reduction in the reconstructed image that can be approximated by a piecewise substantially constant image after sinogram filtering. A non-linear Gaussian filter (NLGF) chain, a representative algorithm of the group of EPS, provides smoothing of noise without destroying the fine details and coarser structures. The NLGF chain has several important advantages, for example, it is numerically robust (choice of the parameters is not critical), and it is faster than other statistics estimation smoothing. A chain of three to five filters with suitable parameters can be enough to differentiate random noise from intrinsic information (structure) in an image. Though EPS can be applied directly in this situation, it's sub-optimal because the EPS methods can assign a uniform standard deviation to all pixels without considering the spatial noise variation in the reconstructed image (due to nonstationary noise in the projection domain). For an improved treatment of non-uniform noise in CT reconstructed images, the noise properties of FBP (filtered backprojection) reconstruction procedure have been analyzed and an adaptive EPS method has been developed according to an embodiment of the present invention. The adaptive EPS utilizes both noise properties and spatial information with smoothing parameters locally adaptive to the raw data and noise variation.

The present invention provides an efficient means for low-dose CT and ECT modalities by integrating available information into a well-established framework for an accurate handling of the problem. The method can account for the prior knowledge of the noise properties, and the 3D spatial information. Therefore, more accurate treatment of nonstationary noise can be achieved for low-dose CT and ECT applications. This software module of noise treatment is quantitatively accurate and computationally efficient. It is low cost, except for a few minutes of computing time, but can be used with small doses of radiation for both CT and ECT. Therefore, it will broaden the use of these modalities, especially for mass screening applications. Low-dose experimental results demonstrate that the proposed system with appropriate control parameters provides a significant improvement on noise suppression without sacrificing the spatial resolution.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
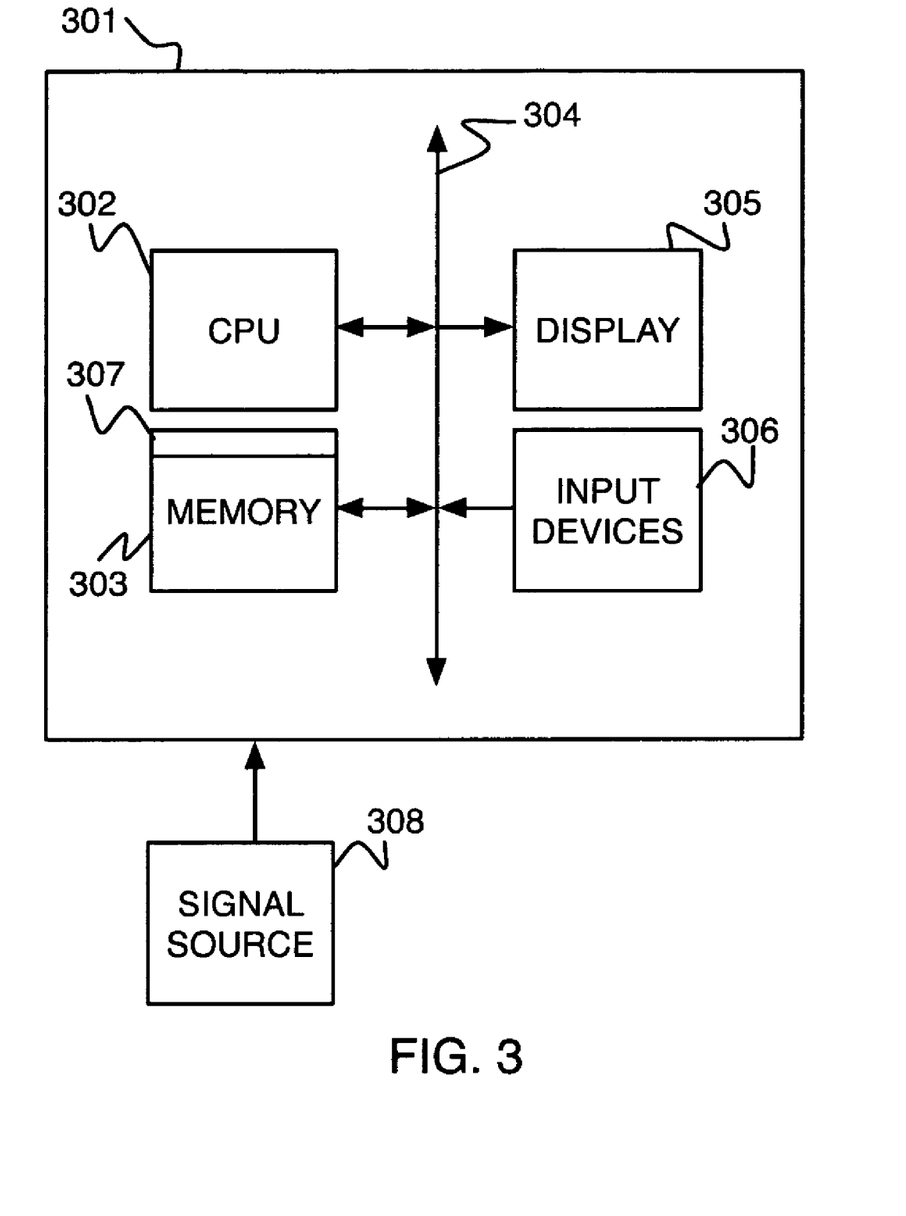
FIG. 3 is a diagram of a system according to an embodiment of the present invention.

Referring to FIG. 3, according to an embodiment of the present invention, a computer system 301 for implementing the present invention can comprise, inter alia, a central processing unit (CPU) 302, a memory 303 and an input/output (I/O) interface 304. The computer system 301 is generally coupled through the I/O interface 304 to a display 105 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
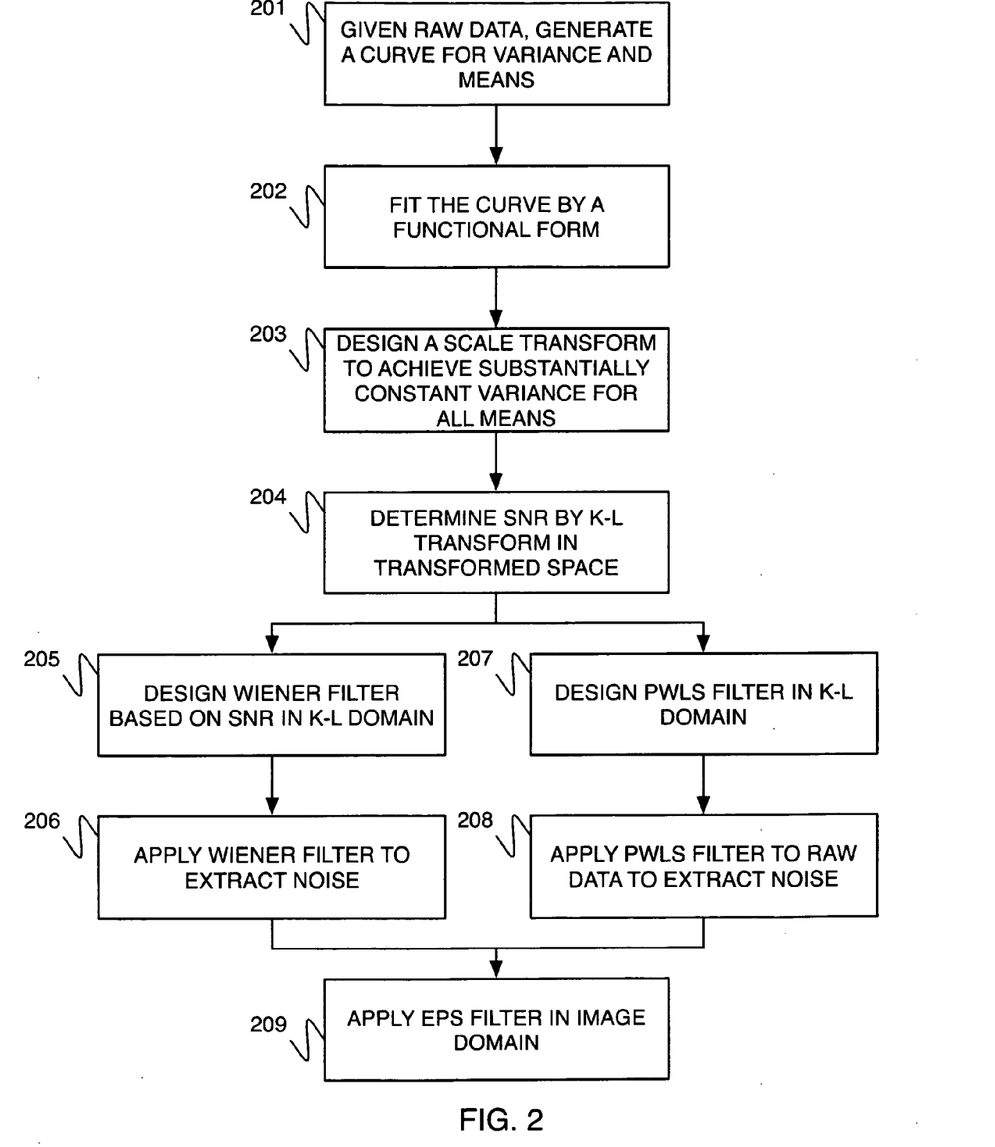
FIG. 2 is a flow chart of a transformation method and a statistical optimization method according to an embodiment of the present invention.
Figure 4A:
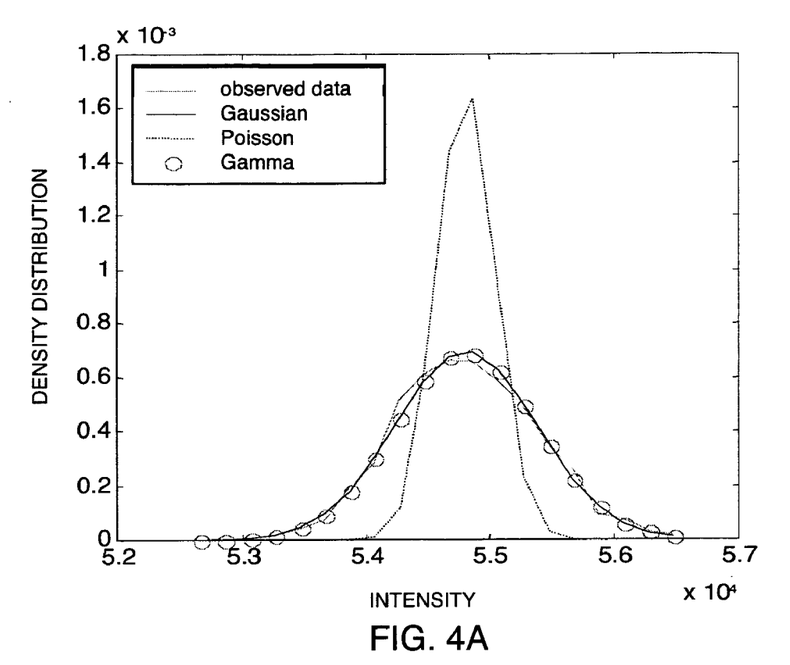
FIG. 4A is a graph showing a noise property of acquired low-dose CT projection data according to an embodiment of the present invention.
Figure 4B:
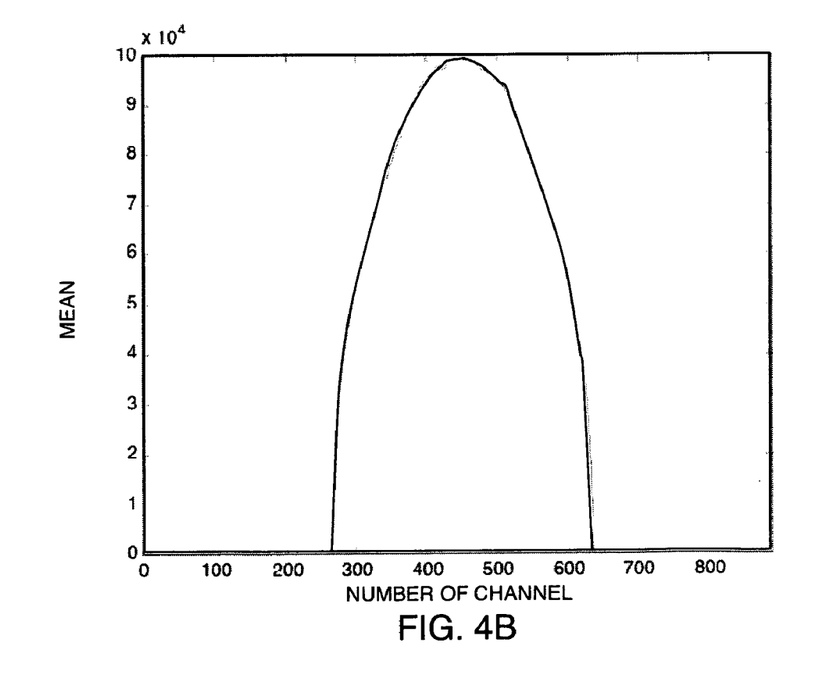
FIG. 4B is a graph showing a mean distribution of the data across the channels according to an embodiment of the present invention.

To analyze the noise property of low dose CT data, projection measurements were acquired for a physical phantom at a fixed angle by a GE spiral CT scanner (900 projection measurements). The measurements were calibrated and corrected as projection data to satisfy the Radon transform. Given the raw data, variance and means curves can be determined as shown in FIG. 2, block 201. The probability distribution of the calibrated data from channel 600 is shown in FIG. 4A with comparison to corresponding Poisson, Gamma, and Gaussian probability distribution functions (PDF). It can be clearly seen that the noise distribution of the projection data has an approximated Gaussian functional, instead of usually assumed Poisson distribution. The mean distribution along detector channels is shown in FIG. 4B. It reflects the line integrals at a projection angle across a cylinder phantom.

Figure 5A:
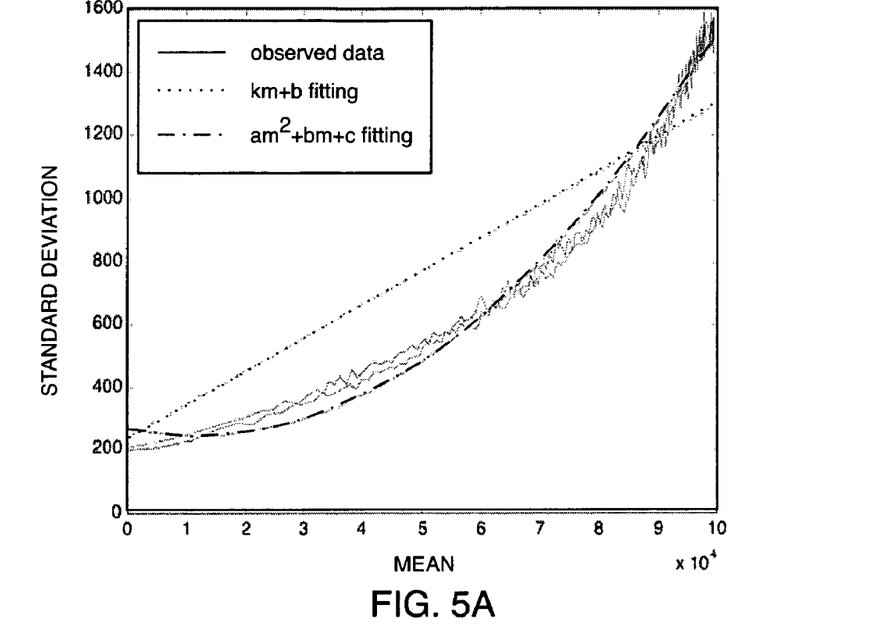
FIG. 5A is a graph showing a standard deviation-mean curve according to an embodiment of the present invention.
Figure 5B:
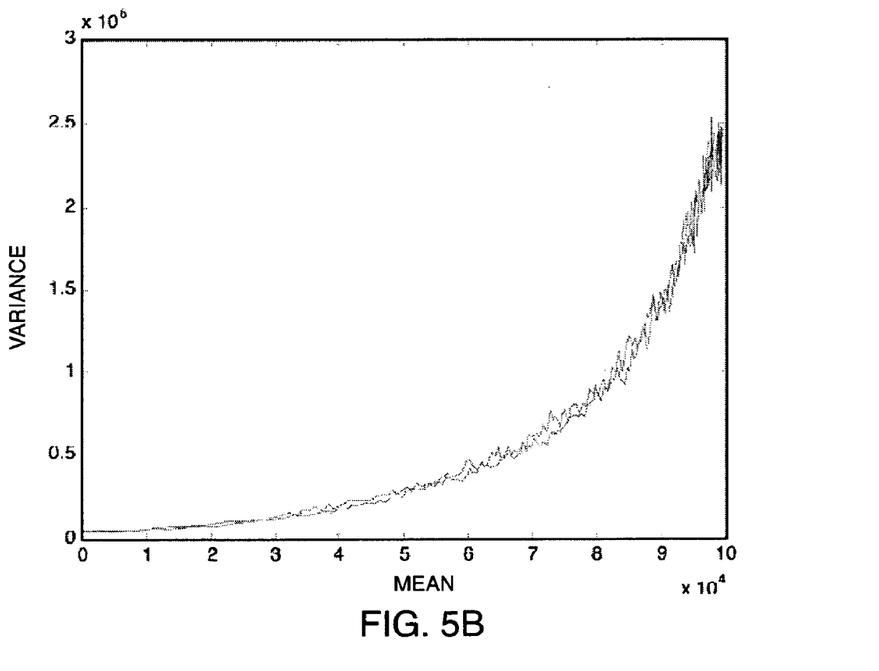
FIG. 5B is a graph showing a variance-mean curve according to an embodiment of the present invention.

The relationship between the standard deviation and the mean of the calibrated data for all the channels is shown in FIG. 5A, while the relationship between noise variance and data mean is shown in FIG. 5B. It is seen that the relationship between the data standard deviation (or noise variance) and the data mean can be nonlinear and may not have an analytical functional formula. According to the relationship between the standard deviation and the mean of the CT projections, $\sigma_x = km+b$ and $\sigma_x = am^2 + bm + c$ can be used to fit the curve, as shown in FIG. 2, block 202 and FIG. 5A, with the minimum least-square criterion.

The general purpose of scale transformations is to change the scale of the measurements to make the statistical analysis more valid, especially for the analysis of variance. For measurements with constant variance, complex smoothing approaches have been proposed for accurate treatment of the noise. However, for those with non-stationary variance, conventional low-pass filters would not be appropriate because of their spatially-invariant assumption and because they ignore the signal-dependent nature of the noise. As an alternative, iterative methods consider the noise properties accurately, but their iterative nature demands a heavy computational effort and a mechanism for convergence. According to an embodiment of the present invention, by converting the non-stationary noise of low-dose CT projection data into approximately stationary one with accurate treatment of the noise, the well-established fastest FBP reconstruction would provide the similar improvement as the iterative methods without the computing burden and the regularization and convergence issues. For Poisson noise as in ECT projections, the scale transform becomes the square-root transformation.

If the dependence of the variance on the mean level has a mathematical form of $$\sigma_x^2 = f(m), \tag{4}$$

where $\sigma_x^2$ is the variance of variable x with mean equal to m, then for any function g(x), there is approximately $$\sigma^2(g(x)) f(m)(dg(m)/dm)^2, \tag{5}$$

where $\sigma^2(g(x))$ is the variance of transformed data g(x), and dg(m)/dm reflects the first derivative of function g.

To make $\sigma^2(g(x))$ a constant, $C^2$ say, then $$g(m) = \int \frac{C\,dm}{\sqrt{f(m)}} \qquad (6)$$

For example, if the variance $\sigma_x^2$ tends to be proportional to the mean level, then the Anscombe transform would be a choice (e.g., for SPECT and PET modalities). If the standard deviation $\sigma_x$ tends to be proportional to the mean level m, there is g(m) proportional to log(m), then the logarithmic scaling would be a choice. The approximation of a scaled variable to a normal distribution is based on the first and second moments of the distribution.

Figure 6A:
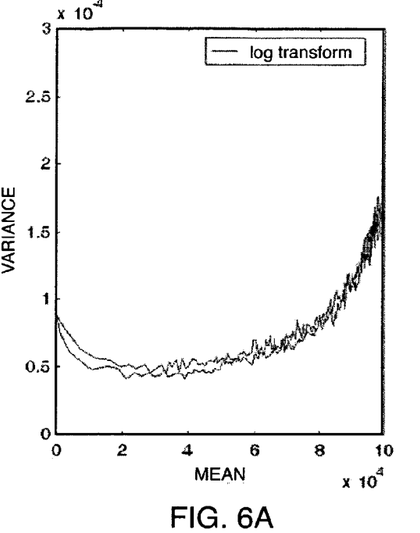
FIG. 6A is a graph showing a variance-mean curve for a log transform given in equation (7) according to an embodiment of the present invention.
Figure 6B:
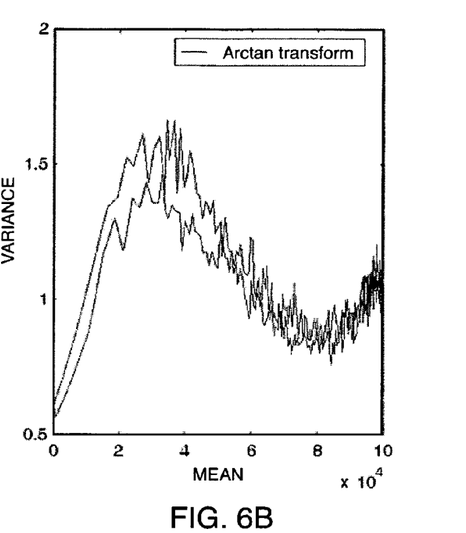
FIG. 6B is a graph showing a variance-mean curve for an arctan transform giving in equation (8) according to an embodiment of the present invention.
Figure 7A:
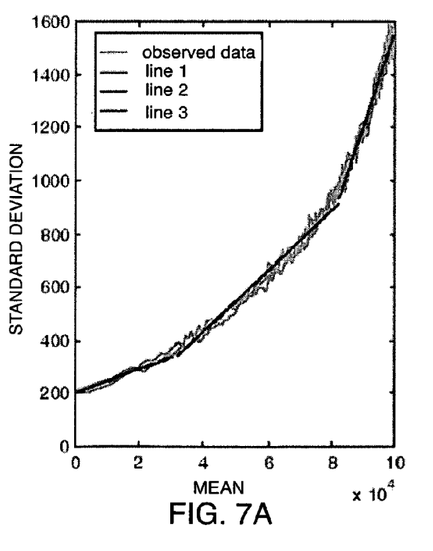
FIG. 7A is a graph showing a standard deviation-mean curve and three fitting lines according to an embodiment of the present invention.
Figure 7B:
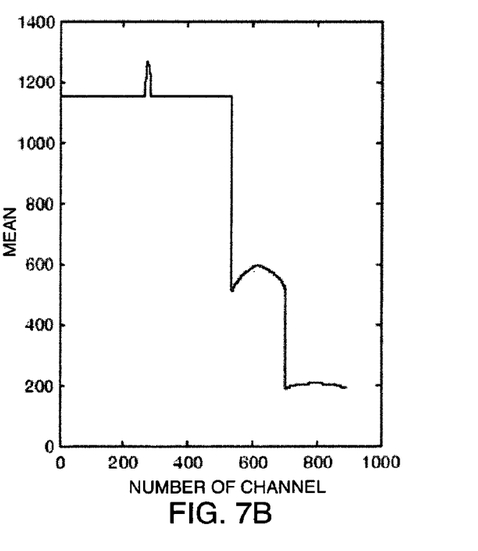
FIG. 7B is a graph showing a mean distribution of segmented transformed data according to an embodiment of the present invention.
Figure 8A:
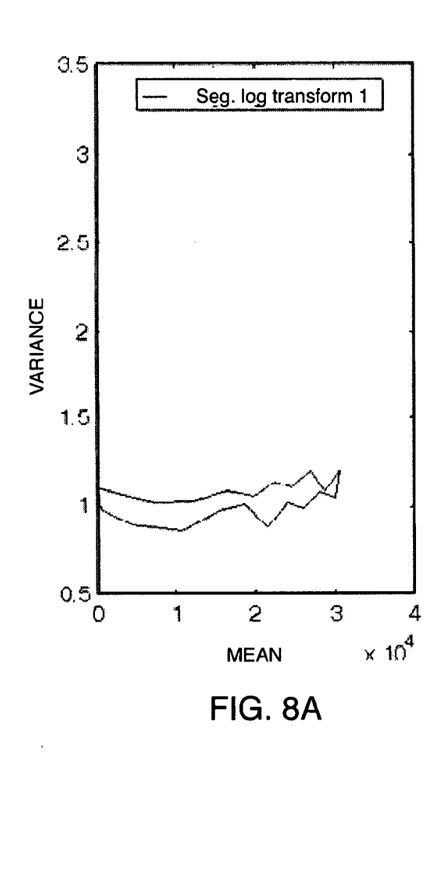
FIGS. 8A–C show three data regions scaled by different log transforms according to an embodiment of the present invention.
Figure 8B:
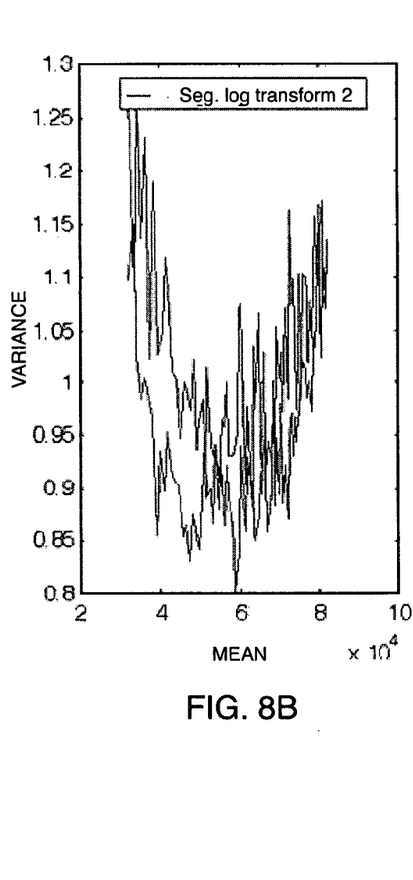
Figure 8C:
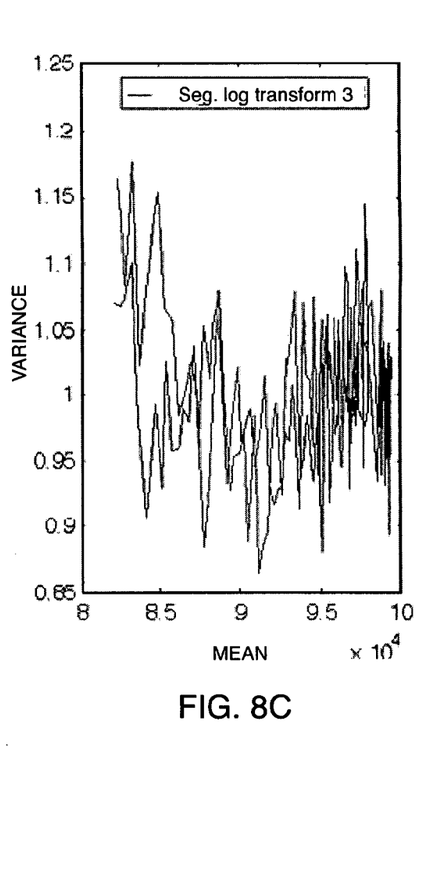

To determine an appropriate scale transform for data with arbitrary distribution, an expression, f(m), can be determined, FIG. 2, block 203. As stated above, the CT projections, $\sigma_x = km+b$ and $\sigma_x = am^2+bm+c$ can be used to fit the curve with the minimum least-square criterion. The quadratic fitting is an improvement over the linear fitting. The corresponding transform g(x) for the linear fitting $f(m)=(km+b)^2$ is the logarithmic transform, as shown below $$g(x) = \frac{C}{k}\ln(kx+b) + C_1 \qquad (7)$$

where C is the expected constant standard deviation for transformed data and $C_1$ is an arbitrary constant. The scale transformation corresponding to the quadratic fitting $f(m)=(am^2+bm+c)^2$ is the inverse tangent transform like $$g(x) = \frac{2C}{\sqrt{4ac-b^2}} \arctan \frac{2ax+b}{\sqrt{4ac-b^2}} + C_2 \qquad (8)$$

where $C_2$ also is an arbitrary constant. After applying these scale transforms to the calibrated projection data respectively, the variance-mean curves of transformed data are shown in FIGS. 6A and 6B. It can be seen that though the range of variation of the data variance is reduced from $0 \sim 2.6 \times 10^6$ to $0.4 \sim 1.8$, it is still not a stable variable, especially for that of the inverse tangent transform. Thus, when applying the Wiener filter to perform smoothing, artifacts appear because of the non-stability of the variance, especially around low mean level and high mean level region. Considering the unmatched parts of the linear fitting with the standard deviation-mean curve, a segmented logarithmic transform can be implemented to improve the variance property of the transformed data, as shown in FIG. 7A. The original standard deviation-mean curve was fitted into three parts by three fitting lines, under the minimum least-square criterion. Thus, the corresponding logarithmic transform comprises three different log transforms applied to the data at different mean levels, which can be called as segmented logarithmic transforms. The variance-mean curves for segment-transformed data at different mean levels are shown in FIGS. 8A to 8C. It can be clearly seen that the variance of transformed data is greatly stabilized and approximately equal to one, especially at both low-level and high level mean regions. The improvement provided by the proposed segmented logarithmic transforms is significant.

After the scale transformations, the modulated projection data achieved approximately a constant variance. A K-L transform can be applied to determine a signal-to-noise ratio, as shown in FIG. 2, block 204. Based on the signal-to-noise ratios, a plurality of neighboring sinograms can be selected as descried below. Then an accurate filtering method can be derived, as shown in FIG. 2, block 205. The Wiener filter is one example of a filter according to an embodiment of the present invention. Another example is the Kalman filter as shown in (X. Li, et al, A noise reduction method for non-stationary noise models of SPECT sinogram based on Kalman filter, *Conference record of IEEE NSS and MIC*, 2001). Assuming that each sinogram is spatially stationary, then the Wiener filter for 2D sinograms in frequency domain can be expressed as $$H(\omega_s, k_\theta) = \frac{S_g(\omega_s, k_\theta) - \sigma_n^2}{S_g(\omega_s, k_\theta)} \qquad (9)$$

where Sg is the 2D discrete Fourier transform (FT) of scaled sinogram g and $(\omega_s, k_\theta)$ denotes the 2D FT coordinates. Notation $\sigma_n^2$ is the noise variance. Since the variance of scaled projection data is approximately constant after the scale transformations, it eliminates the difficulty of the estimation of noise power spectrum in the Wiener filtering, FIG. 2, block 206. That means, $\sigma_n^2$ can be regarded as a constant, which can be derived from f(m) and g(m), during filtering process.

Other types of filters can be implemented (FIG. 2, block 206) to improve the properties in terms of noise suppression, edge preservation, and etc. Filter selection would be obvious to one of ordinary skill in the art in light of the present invention. Wiener filter is selected based on its well-known properties of minimum least-square error on a linear system, its easy implementation and its efficiency in computation. The Kalman filter can be another choice for very low count cases (e.g., SPECT), due to its ability to handle the extreme situations.

Referring now to the PWLS framework, statistical estimation approaches (not transformation-based techniques) have the advantages of modeling the noise nature and providing an optimal solution consistent with the objective cost criterion. Given the Gaussian functional PDF of the low-dose CT noise property and the mean-variance relationship, a weighted least square (or maximum likelihood with Gaussian statistics) criterion has been determined according to an embodiment of the present invention, which determines a solution for normally distributed data with non-stationary variances.

The PWLS criterion estimates the ideal (or noise-free) projections by minimizing the cost function of $$\Phi(p) = \tfrac{1}{2}(y-Hp)^T \Sigma^{-1}(y-Hp) + \beta R(p) \qquad (10)$$

The acquired noisy projection data can be treated by minimizing the above cost functional of in which y is a vector of the readout projection data $\{y_i\}$ (i.e., the calibrated and log transformed data to be treated by the presented methodologies), p represents the ideal (noise-free) sinogram or projection data, $\Sigma$ is the diagonal variance matrix of y, H is system matrix that can describe the blurring in the sinograms (in the pilot study, the blurring was not considered), and T denotes transpose operation. An adjustable parameter $\beta$ is introduced for the regularizing penalty term R(p) to control the degree of smoothness. Minimizing $\Phi(p)$ means a tradeoff between the smoothness and a weighted agreement with the measurements, where the smoothing parameter β controls that tradeoff. An example of a penalty according to an embodiment of the present invention is the quadratic penalty of $$R(p)=\tfrac{1}{2}(p-\bar{p})^T W^{-1}(p-\bar{p}) \quad (11)$$

where $\bar{p}=E[p]$ ensures the smoothness within a ROI (region of interest) of similar statistical properties, and matrix $W^{-1}$ is the regularization operator and determines the nature of the smoothing.

For dealing with 3D datasets, especially for spiral CT applications, the continuing spiral sampling along the axial direction provides partial information on the axial resolution, resulting in a strong spatial correlation along the axial direction among the sinograms of the 3D projection data. This spatial correlation information is helpful for noise treatment on any tomographic data through K-L principal component analysis.

According to an embodiment of the present invention, spatial K-L transformations can be used as a tool for feature extraction and de-correlation. The K-L transformation manipulates a sequence of correlated measurements into an uncorrelated, ordered principal component series, each of which maximizes the data variance and, therefore, provides a unique means for noise reduction, feature extraction and de-correlation.

For a 3D spatial processing, the K-L transformation can be applied spatially along the axial direction of slices (or sinograms) or along views (or projections). Its forward and inverse formula can be defined as Forward K-L Transformation: $\check{y}=A_M y$ Inverse K-L transformation: $=A_M^T \check{y}$ where $A_M=A I_M$ and A is the K-L basic vectors that can be obtained as the eigenvectors of the spatial covariance matrix $K_t$ (K×K) to be calculated from the total K neighboring slices, and $K_t A^T = A^T D$. Notation D is a diagonal matrix of eigenvalues $d_i$; $I_M$ denotes the M×M identity matrix; and represents the Kronecker product.

In the K-L domain, $$\check{y}=A_M y = A_M H p + A_M n = H p' +, \quad (12)$$

where $=A_M n$, $p'=A_M p$ is the K-L transformed ideal data. By the K-L transformation, the principal components in the K-L domain are independent and remain the same form as in spatial domain. Thus, many estimation methods deduced in the spatial domain are still applicable in the K-L domain. On the other hand, since the sinogram information in the K-L domain decreases monotonically from the lower order components to the higher order components, the high-order K-L components could be discarded for further noise removal to save the computing time, without losing noticeable information.

For implementing the PWLS optimization in the K-L domain, the following can be considered: The ideal projection data or sinograms between neighboring axial slices are greatly correlated due to the axial spiral sampling. Treating the sinograms individually slice-by-slice in a 2D manner would ignore the spatial correlation along the axial direction. With the de-correlation feature, K-L transformation simplifies the complex task of a 3D process into a 2D process separately. Accordingly, the raw data can be decomposed according to SNR using the K-L transform, as shown in FIG. 2, block 207. The SNR can be estimated for each component making a more effective treatment possible. Since in K-L domain all principal components are arranged according to their variances, the high-order K-L components could be discarded for further noise removal and time saving.

A K-L domain PWLS filtering can be based on the following assumption: if the regularization operator is chosen to be separable into two components (separability assumption) as $$W^{-1}=[K_t W^{2D}]^{-1} \quad (13)$$

then the PWLS cost functional in Eqn. (10) can be greatly simplified into K independent functions in the K-L domain $$\Phi_l(\check{p}_l)= \quad (14)$$
$$\tfrac{1}{2}(\check{y}_l-H_l\check{p}_l)^T \check{\Sigma}_l^{-1}(\check{y}_l-H_l\check{p}_l)+\tfrac{1}{2}\left(\tfrac{\beta}{d_l}\right)(\check{p}_l-\check{\mu}_l)^T [W^{2D}]^{-1}(\check{p}_l-\check{\mu}_l)$$

where $\check{p}_l$, $\check{y}_l$, and $\check{\mu}_l$ are the l-th K-L components of p, y, and $\bar{p}$, respectively, and $l=1, \ldots, K$. Notation $\check{\Sigma}$ is the diagonal variance matrix of $\check{y}_l$, and $d_l$ is the eigenvalue associated with the l-th K-L vector.

Eqn. (14) is quadratic in $\check{p}_l$. Based on the modeled Gaussian statistics, the estimation of projection data in the K-L domain is explicitly $$\hat{\check{p}}_l = \left(H_l^T \check{\Sigma}_l^{-1} H_l + \left(\tfrac{\beta}{d_l}\right)[W^{2D}]^{-1}\right)^{-1} H_l^T \check{\Sigma}_l^{-1} \check{y}_l \quad (15)$$

It is noted that unlike the spatial domain PWLS, here $\beta/d_l$ is used as smoothing parameter in the K-L domain PWLS. A new system matrix $H_l$ can be derived from the matrix H by the K-L transformation. System matrix $H_l$ describes the blurring in each individual sinogram (a complete projection data from a 2D image slice). Matrix $H_l$ can be set equal to identity matrix to ignore the blurring effect in the low-dose CT projections. In general cases, the matrix is not identical matrix. It can include the measured point source response function (PSF) to consider any resolution blurring for an improved resolution via the presented invention. For example, if the axial blurring PSF is considered, an improved axial resolution will be obtained after applying the present invention.

By selecting an appropriate number of neighboring slices or sinograms along the axial direction from the 3D CT projection data, the K-L domain PWLS strategy can fully utilizes the prior statistical knowledge and the 3D spatial information for an accurate estimation of the signals (or means of the measurements) from the noisy low-dose CT projections.

The parameters of the PWLS cost function can be determined, FIG. 2, block 208, for example, as follows:

(1) Estimation of $\Sigma^{-1}$

Relying on the weights Σ on the estimation of the variance as computed from the above mean-variance curve and the measurements themselves, a functional fitting can be applied to match the above mean-variance curve. For a given pixel (for a simplified voxel in two dimensions), a median filter (e.g., 3×3 or 5×5) can be used to get an estimate of the data mean. The estimated data variance can be determined by inserting the estimated mean into the fitted function. Since this estimate may be unreliable for very small $y_l$, a small threshold K>0 can be utilized for a sensible weighting.

(2) Selection of Neighborhood

It is commonly recognized that the farther away two slices or sinograms are (in the axial direction), the lower the correlation will be. After an appropriate number of neighbor slices (K) is selected, the covariance matrix $K_t$ of projection data can be estimated from $$K_{t,kl} = \frac{1}{M-1} \sum_{i=1}^{M} (y_{k,i} - \bar{y}_k)(y_{l,i} - \bar{y}_l) \qquad (16)$$

where $$\bar{y}_k = \frac{1}{M} \sum_{i=1}^{M} y_{k,i}, k, l = 1, \ldots, K \qquad (17)$$

(3) Determination of Penalty Term

The penalty or regularization embedded in the cost functional determines the weights of the measurements and the desired noise smoothing. A possible choice of $[W^{2D}]^{-1}$ can be $Q^T Q$, where Q is a block-circulant matrix representing a discrete approximation of the 2D Laplacian operation. For 1D cases, multiplication by $[W^{2D}]^{-1}$ is equivalent to convolve each row of the sinogram with the kernel [−4 6 −4]. In this situation, Eqn. (15) can be easily and rapidly computed as a row-by-row operation on the sinograms in the K-L domain. If a membrane prior is used as 2D spatial regularization operator (smoothing prior), multiplication by $[W^{2D}]^{-1}$ is equivalent to convolve the sinogram with the kernel $$\begin{bmatrix} -\sqrt{2} & -2 & -\sqrt{2} \\ -2 & 8+4\sqrt{2} & -2 \\ -\sqrt{2} & -2 & -\sqrt{2} \end{bmatrix}^* \qquad (18)$$

In the spatial domain, the smoothing parameter β controls the degree of smoothness in the PWLS criterion. However, for K-L domain PWLS, the smoothing parameter becomes $\beta/d_l$, where $d_l$ is the eigenvalue of the l-th K-L domain sinogram component. It suggests that K-L components with small eigenvalues (or large variance) would be smoothed intensively or be discarded for fast computation.

Figure 9:
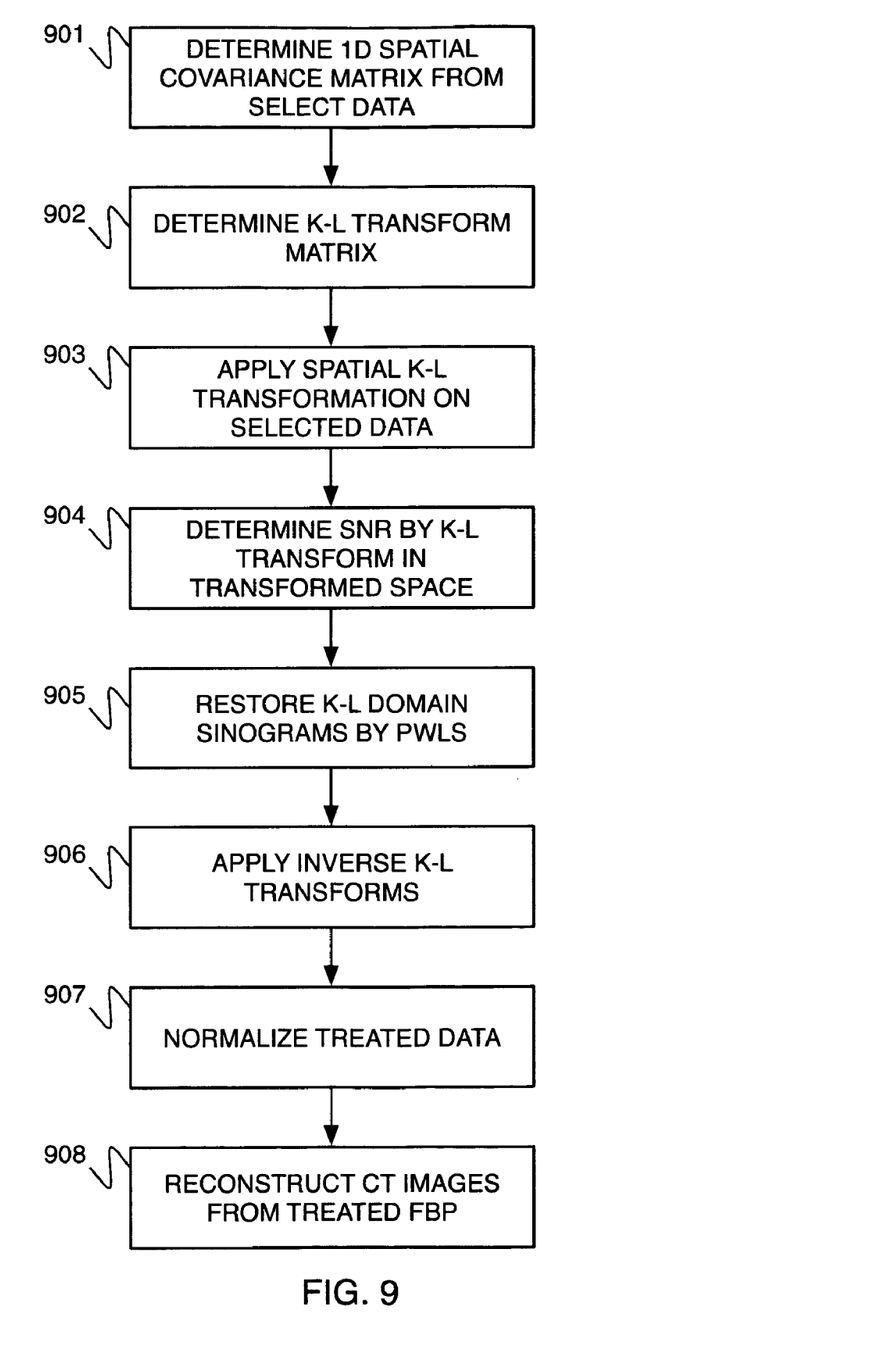
FIG. 9 is a flow chart of a PWLS method according to an embodiment of the present invention.

Thus, the implementation procedure of the proposed K-L domain PWLS optimization for noise treatment of low-dose CT projection data can be considered as follows, with references to FIG. 9:

Determine the spatial covariance matrix $K_t$ from a selected number of neighboring slices or views according to Eqn. (16) (901);

Determine the K-L transform matrix A from $K_t$ based on $K_t A^T = A^T D$ (902);

Apply the spatial K-L transformation on the selected neighboring projection data or sinograms (903 & FIG. 2, block 209);

Restore the K-L domain sinograms or projections by the PWLS criterion separately for each selected principal component (905);

Apply the inverse K-L transformation on the treated data by $A_{M'}^T$, with the high-order K-L principal components either discarded or smoothed (906);

Normalize the "treated" projection data (907); and

Reconstruct the CT images from the treated projection data by the FBP method (908).

The noise-treatment and resolution enhancement methodologies of the present invention are cost-effective—a software module of executing time at the level of a few minutes on a currently available PC platform for more than a hundred images of the size of 512×512. They can be easily implemented/integrated into the flow chart of FIG. 1 of currently available CT technology. Both the evaluated results on radiation reduction and axial resolution enhancement shall be a very useful reference to guide clinical applications of currently available spiral CT technology utilizing the noise treatment software module.

The experimental phantom projections used for generating the raw data were acquired by a GE spiral CT scanner with a fan-beam curved detector array. The phantom used here is a cylinder with several small details. The number of channels per view is 888 with 984 views evenly spanned on a circular orbit of 360°. The detector array is on an arc concentric to the X-ray source with a distance between the X-ray source and the rotation center equal to 541 mm. The distance from the rotation center to the curved detector is 408.075 mm. The detector cell spacing is 1.0239 mm. After pre-reconstruction correction for system calibration, the calibrated projection data were filtered by different kinds of smoothing methods for comparison purpose.

The filtered projection data, whether by scale transform or by PWLS, can be reconstructed by the conventional FBP method with the Ramp filter, FIG. 2, block 210. To see the influence of the variance stability of the scale transformations on sinogram smoothing, the projection data can be filtered by the Wiener filter after different kinds of the scale transformations.

Reconstructed images filtered by a Hanning filter can reveal the tradeoff between image resolution and noise. Insufficient noise suppression was observed for higher cutoff frequencies. For lower cutoff frequencies, image resolution can be sacrificed. Although the single logarithmic transform provides some degree of noise smoothing, it generates circular artifacts around the center of the rotation in the reconstruction images. This can be due to the single logarithmic transform's poor ability to stabilize the data variance, as shown in FIG. 6A. The scaled variance after the single log transform fluctuates between 0.4~1.8. The variance fluctuation is reduced to the range of 0.8~1.3 after applying the segmented log transforms. The variance-mean curves of the segmented log transforms are more stabilized, especially at the regions with low and high mean levels (FIGS. 8A and 8C respectively). Reconstructed images also show that the segmented log transforms can eliminate the circular artifacts and provide a better noise suppression than the low-pass filters, such as the Hanning filter, without the sacrifice of the spatial resolution.

Following the filtering of the projection data/sinogram domain, edge preserving smoothing (EPS) can be implemented for further noise reduction in the reconstructed image FIG. 2, block 211. A non-linear Gaussian filter (NLGF) chain, a representative algorithm of the group of EPS, provides smoothing of noise without destroying the fine details and coarser structures. A chain of filters, for example, three to five, with suitable parameters can differentiate random noise from intrinsic information (structure) in the image domain. For an improved treatment of non-uniform noise in CT reconstructed images, the noise properties of the FBP reconstruction procedure can be analyzed and an adaptive EPS method can be developed. The adaptive EPS utilizes noise properties and spatial information with smoothing parameters locally adaptive to the raw data and noise variation.

Regarding the NLGF chain, for an image with value f(p) at pixel p, a nonlinear Gaussian filtering operation can be defined by:

$$G_{\sigma_x,\sigma_z} f(p) = f(p) + \eta \cdot \frac{1}{N_P} \quad (19)$$

$$\sum_{q \in P} g_{\sigma_x}(\|q-p\|) g_{\sigma_z}(f(q)-f(p)) \cdot (f(q)-f(p)) \text{ with } g_\sigma(t) =$$

$$\exp\left(\frac{-t^2}{2\sigma^2}\right) \text{ and } N_P = \sum_{q \in P} g_{\sigma_x}(\|q-p\|) g_{\sigma_z}(f(q)-f(p)).$$

where $\sigma_x$ and $\sigma_z$ are smoothing parameters measuring the width of $g_{\sigma x}$ and $g_{\sigma z}$, respectively. P is the averaging neighborhood of pixel p and $\eta$ is chosen to provide numerical stability of the approximation.

For smoothing, several filtering steps with different parameters can be performed, which are called NLGC chains. Formally it can be written in the form:

$$G^{\sigma_{xn},\sigma_{xn}} \circ \ldots \circ G^{\sigma_{x1},\sigma_{z1}} F.$$

For adaptive EPS, though EPS can be applied directly to any image that can be approximated by a nearly piecewise-constant image, it's sub-optimal in treating nonstationary noise because it assigns a uniform variance to all pixels without considering the spatial noise variation in the image. For an improved treatment of nonstationary situation, an adaptive EPS method has been developed.

Under an assumption of uncorrelated noise, the variance of the distribution between pixel p and q is $$\sigma_{p,q}^2 = \sigma_p^2 + \sigma_q^2$$

where $\sigma_p$ and $\sigma_q$ are the standard deviation of pixel p and q. Choosing the "robust scale" for rejection of edges for each pair of the neighboring pixels p and q in term of the population standard deviation $\sigma_{p,q}$, the smoothing parameter $\sigma_z$ above can be expressed as $$\sigma_{z_{p,q}} = \omega \cdot \sigma_{p,q} \quad (20)$$
$$= \omega \cdot \sqrt{\sigma_p^2 + \sigma_q^2}$$

which is spatially variant and locally adaptive to the noise variation. $\omega$ is a normalization weight and can be determined by the filtering function. Considering the Eqs. (19) and (20), the adaptive EPS we proposed takes the noise properties into account, as well as the spatial information.

Having described embodiments for a system and method of treating noisy CT and ECT projections, as well as reconstructed images, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for treating noise in low-dose computed tomography projections and reconstructed images comprising the steps of:

acquiring raw data at a low mA value;
applying a domain specific noise filter in a sinogram domain of the raw data; and
applying an edge preserving smoothing filter in an image domain of the raw data after filtering in the sinogram domain, wherein the adaptive edge preserving smoothing filter is based on one of a curve and a fitted curve.

2. The computer-implemented method of claim 1, wherein the low mA value is less than about 100 mA.

3. The computer-implemented method of claim 1, wherein the raw data is patient specific raw data.

4. The computer-implemented method of claim 1, wherein the raw data is based on anthropomorphic phantoms.

5. The computer-implemented method of claim 1, further comprising the steps of:
determining the domain specific noise filter with the raw data, such that the domain specific noise filter has prior knowledge of a noise property of the sinogram domain prior to being applied; and
determining the edge preserving smoothing filter with the raw data.

6. The computer-implemented method of claim 1, further comprising the steps of:
generating a curve for variances and means given the raw data;
fitting the curve by a functional form;
determining, for a fitted curve, a transformed space having substantially constant variance for all means;
determining, for a substantially constant variance, a transform space having estimated signal-to-noise ratios; and
filtering the raw data in the transformed space.

7. The computer-implemented method of claim 6, wherein the step of filtering further comprises the step of applying one of a Wiener filter and a Kalman filter.

8. The computer-implemented method of claim 6, wherein the fitting is one of linear, quadratic, non-linear, and square root.

9. The computer-implemented method of claim 6, wherein the step of determining, for a fitted curve, a transformed space is by a logarithmic transform for a linear fitting, an inverse tangent transform for a quadratic fitting, a segmented logarithmic transform for a non-linear fitting, and an Anscombe transform for a square-root fitting.

10. The computer-implemented method of claim 6, wherein the step of determining, for the substantially constant variance, a transformed space is a Karhunen-Loeve transform, whose eigenvalues and the substantially constant variance are the estimate of the signal-to-noise ratios.

11. The computer-implemented method of claim 1, further comprising the steps of:
generating a curve for variances and means given the raw data;
fitting the curve by a functional form;
determining a signal-to-noise ratio in the transformed space;
selecting plurality of neighboring sinograms along an axial direction of the computed tomography projections, wherein the raw data is three-dimensional projection data; and
applying a Karhunen-Loeve domain penalized weighted least square smoothing filter.

12. The computer-implemented method of claim 11, wherein determining the signal-to-noise ratio in the transformed space is by Karhunen-Loeve transform.

13. The computer-implemented method of claim 1, further comprising the step of acquiring a point source response function for resolution enhancement by incorporating the point source response into the domain specific filters of Wiener, Kalman, and penalized weighted least square smoothing filters.

14. The computer-implemented method of claim 1, wherein the edge preserving smoothing filter is a non-linear Gaussian filter chain, wherein the edge preserving smoothing filter is one of adaptive and non-adaptive.

15. The computer-implemented method of claim 1, wherein the domain specific noise filter and the edge preserving smoothing filter is applied to emission computed tomography projections, where the raw data is noisy due to low dose radiopharmaceutical administration.

16. The computer-implemented method of claim 15, comprising the steps of:
generating a curve for variances and means given the raw data;
fitting the curve by a functional form;
determining, for a fitted curve, a transformed space having substantially constant variance for all means according to an Anscombe transform; and
filtering the raw data in the transformed space, wherein a Kalman filter and a Wiener filter is applied to the raw data.

17. A computer readable medium embodying instructions executable by a processor to perform a method comprising:
generating a curve for variance and means given a set of raw data;
fitting the curve by a functional form;
determining, for a fitted curve, a transformed space having substantially constant variance for all means and having readily available signal-to-noise ratios;
applying a domain specific noise filter in a sinogram domain of the set of raw data; and
applying an edge preserving smoothing filter in an image domain of the set of raw data after filtering in the sinogram domain.

18. The method of claim 17, wherein the computed tomography projections are emission computed tomography projections.

19. An image data filter system comprising:
a variance curve of image data;
a means curve of the image data, wherein a relationship between the variance curve and the means curve determines a fit of the image data to a minimum least-square criterion;
a domain specific noise filter receiving the image data, the domain specific noise filter for processing a sinogram domain of the image data; and
an edge preserving smoothing filter receiving the image data having a filtered sinogram domain, the edge preserving smoothing filer for processing an image domain of the image data.

20. The system of claim 19, wherein the fit is one of a logarithmic transform for a linear fitting, an inverse tangent transform for a quadratic fitting, a segmented logarithmic transform for a non-linear fitting, and an Anscombe transform for a square-root fitting.

21. The system of claim 19, wherein the domain specific filter is one of Wiener, Kalman, and penalized weighted least square smoothing filters.

22. The system of claim 19, wherein the domain specific filter is adaptive to a signal-to-noise ratio of the image data.

23. The system of claim 19, wherein the edge preserving filter is adaptive to noise properties of the image data and spatial information spatial information of the image data.

24. A computer-implemented method for treating noise in low-dose computed tomography projections and reconstructed images comprising the steps of:
acquiring raw data at a low mA value, wherein the low mA value is less than about 100 mA;
applying a domain specific noise filter in a sinogram domain of the raw data; and
applying an edge preserving smoothing filter in an image domain of the raw data after filtering in the sinogram domain.

* * * * *